United States Patent
Edwards et al.

(10) Patent No.: US 10,313,533 B2
(45) Date of Patent: Jun. 4, 2019

(54) POWER DISTRIBUTION FOR TELECOMMUNICATIONS SYSTEM

(71) Applicant: BRITISH TELECOMMUNICATIONS public limited company, London (GB)

(72) Inventors: Nicholas Hector Edwards, London (GB); Ian Robert Cooper, London (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 651 days.

(21) Appl. No.: 14/386,755

(22) PCT Filed: Feb. 27, 2013

(86) PCT No.: PCT/GB2013/000081
§ 371 (c)(1),
(2) Date: Sep. 19, 2014

(87) PCT Pub. No.: WO2013/140108
PCT Pub. Date: Sep. 26, 2013

(65) Prior Publication Data
US 2015/0071429 A1 Mar. 12, 2015

(30) Foreign Application Priority Data

Mar. 20, 2012 (EP) .................... 12250064
Mar. 20, 2012 (EP) .................... 12250065
Mar. 20, 2012 (EP) .................... 12250067

(51) Int. Cl.
*H04M 19/00* (2006.01)
*H04L 12/10* (2006.01)
(Continued)

(52) U.S. Cl.
CPC ............ *H04M 19/001* (2013.01); *H04B 3/46* (2013.01); *H04L 12/10* (2013.01);
(Continued)

(58) Field of Classification Search
CPC ...... H04M 19/00; H04M 19/08; H04M 3/005; H04M 1/738; H04L 12/10; H04L 12/12
(Continued)

(56) References Cited

U.S. PATENT DOCUMENTS 5,224,154 A 6/1993 Aldridge et al.
5,469,282 A * 11/1995 Ishioka .................... 398/25
(Continued)

FOREIGN PATENT DOCUMENTS

EP 1936861 6/2008
EP 12250064 6/2012
(Continued)

OTHER PUBLICATIONS

International Search Report of PCT/GB2013/000081 dated Apr. 15, 2013.

*Primary Examiner* — Ahmad F. Matar
*Assistant Examiner* — Jirapon Intavong
(74) *Attorney, Agent, or Firm* — Nixon & Vanderhye P.C.

(57) ABSTRACT

A communications connection comprises intermediate connection points (6,11) connected by a non-conducting communications link (20), with conversion equipment in one or both intermediate points for converting communications between electrical and non-electrical carriers, and each being arranged to be powered from the respective ends (1, 12). If a metallic path (18) is present between the two intermediate points, the system can be arranged to use this for a limited connection service in the event of loss of electrical power to one or both of the intermediate points (6,11).

12 Claims, 10 Drawing Sheets

(51) Int. Cl.
*H04L 12/24* (2006.01)
*H04L 12/28* (2006.01)
*H04B 3/46* (2015.01)

(52) U.S. Cl.
CPC .......... *H04L 12/2869* (2013.01); *H04L 41/08* (2013.01); *Y04S 40/162* (2013.01)

(58) Field of Classification Search
USPC .................................................. 379/322, 324
See application file for complete search history.

(56) References Cited

U.S. PATENT DOCUMENTS

| | | | |
|---|---|---|---|
| 6,246,750 B1* | 6/2001 | Ehreth | H04B 10/25752 |
| | | | 379/56.2 |
| 7,239,628 B1 | 7/2007 | Pendleton et al. | |
| 7,751,711 B2* | 7/2010 | Wynman | H04J 3/14 |
| | | | 370/352 |
| 2003/0202655 A1* | 10/2003 | Nattkemper | H04M 19/001 |
| | | | 379/413 |
| 2006/0164108 A1 | 7/2006 | Herbold et al. | |
| 2006/0251115 A1* | 11/2006 | Haque | H04B 7/2606 |
| | | | 370/466 |
| 2008/0317021 A1 | 12/2008 | Ives et al. | |

FOREIGN PATENT DOCUMENTS

| | | |
|---|---|---|
| EP | 12250065 | 6/2012 |
| EP | 12250067 | 9/2012 |
| WO | WO 01/22716 | 3/2001 |
| WO | WO 02/091790 | 11/2002 |
| WO | WO 2004/111757 | 12/2004 |
| WO | PCT/GB2013/00082 | 4/2013 |
| WO | WO2013/140109 | 9/2013 |
| WO | WO 2013/140110 | 9/2013 |

* cited by examiner

POWER DISTRIBUTION FOR TELECOMMUNICATIONS SYSTEM

This application is the U.S. national phase of International Application No. PCT/GB2013/00081 filed 27 Feb. 2013 which designated the U.S. and claims priorities to EP 12250064.8 filed 20 Mar. 2012; EP 12250065.5 filed 20 Mar. 2012; and EP 12250067.1 filed 20 Mar. 2012, the entire contents of each of which are hereby incorporated by reference.

BACKGROUND AND SUMMARY

This invention relates to telecommunications systems, and in particular to the supply of electrical power to equipment in a telecommunications network.

In the public switched telephone network (PSTN) it is known to provide power from the exchange, or from an intermediate point such as a street side cabinet, to a remote point such as customer premises equipment or another intermediate point such as a drop-point, using the telephone wires themselves—the traditional twisted wire pair, usually made of copper. In the early development of telephone systems, when mains electricity was still comparatively rare, this allowed provision of service to premises which had no reliable power supply, or a supply which was unreliable, and it is still a useful feature of the PSTN system that communication is possible during a local power failure—in particular so that a call can be made to the electricity suppliers to alert them to the power failure.

Telephony access networks were originally designed to carry low frequency voice traffic, but have since been adapted for high speed digital information, for example using Digital Subscriber Line (DSL) technology. The frequencies used for DSL have greater losses in transmission, and this limits the achievable bitrate, particularly on long lines where the losses are greater. A number of schemes have been used to put access multiplexers at intermediate points such as Digital Subscriber Line Access Multiplexers (DSLAMs) installed in street cabinets closer to the user termination point, to reduce the distance between the customer and the multiplexing point. Such an arrangement allows several customer premises equipments to share the available bandwidth between the street cabinet and the exchange, which is possible as data connections are typically "bursty" (variable in their bandwidth requirements) so that although each customer requires a high bandwidth to be available, it is only required for brief periods. Thus several users can share one high bandwidth connection. However, this approach may not be feasible where customers are geographically dispersed.

It is known to provide a link using a medium other than an electrical conductor to carry a communications connection over part of the route between the exchange and customer premises (herein referred to as a non-electrical link). The non-electrical link may be optical fibre, radio or some other medium. Typically, the necessary transceivers at each end of the non-electrical link require a local power supply. Traditional street cabinets are merely junction points in the distribution network, with no operational or computing power. If a DSLAM, or an electrical-to-optical or electrical-to wireless transceiver is to be installed at such a location, electrical power has to be supplied to the cabinet. However, connection of a mains electricity supply to such locations can be difficult.

The present invention, and the inventions which are the subject of the present applicant's related patent applications filed on the same date as the present application, claiming priority from European applications 12250064.8 and 12250065.5, and entitled, "Delivery of Electrical Power" and "Control of Line Power", all relate to managing the use of wire telecommunications lines to provide power to remote equipment. It is known for a wired telecommunications system to be used to distribute electrical power to remote points in the system, such as a drop-point. In particular, there have been proposals for electrical power to be supplied from the customer premises end to support one end of a wireless or fibre communications link, for example, to support wireless broadband connectivity over the access network. Examples are described in International Patent specifications WO2009/138710 and WO2009/138711. The power supply operates independently of any call traffic either over the wireless digital channel or "POTS" (analogue telephony) connection.

The present invention relates to the provision of a communications connection comprising a first intermediate connection point, a second intermediate connection point, and a non-conducting communications link between the first intermediate point and the second intermediate point;
  the first intermediate connection point being connectable by way of a first conducting link to a telephone network connection point and the second intermediate point being connectable by a plurality of second conducting links to a plurality of remote customer premises installations, at least one of the first and second intermediate points having conversion equipment for converting transmissions between electrical signals carried over its respective conducting link, and a non-electrical signal carried over the non-conducting link
  the respective first and second conversion equipments being electrically powered, and having respective power conversion equipment for receiving electrical power delivered over the respective conducting links from the telephone network connection point and the customer premises installations.

In one embodiment the first intermediate connection point is connectable by way of a first conducting link to a telephone network connection point and the second intermediate point is connectable by a plurality of second conducting links to a plurality of remote customer premises installations suitable to form a communications connection between the telephone network connection point and the customer premises installation Typically, the conducting links are of the traditional twisted wire-pair type used in conventional "plain old telephony services" (POTS): On the network side, these may have been upgraded, but many connections to customer premises have remained in use for many years, and the extent and range of the telephone network make it likely that many of them will continue in use for many more years to come. Such links are often unsuitable for carrying modern high-bandwidth services over any but very short distances, and so it is often desirable to replace all but the "final drop" with some other mode of communications link. Electromagnetic means such as wireless or optical fibre communications provide a greater bandwidth, over distances not practical for a wired connection. In this specification these are collectively termed "non-conducting", and in the invention such a non-conducting link is provided between the first and second intermediate points.

Conversion between conducting and non-conducting modes requires an electrical power supply at each of the intermediate points. The invention provides for this power to be delivered over the respective first and second conducting links, from the network connection point and the customer premises respectively.

The first intermediate point may serve several connections, each having its own respective first conducting link. One, several, or all of these connections may be converted to non-conducting mode at the first intermediate point, for forwarding in non-conducting mode to one or more respective second intermediate points. The power delivered from the network connection point can be delivered to the first intermediate point over any one or more of the conducting links, and does not have to be limited to, or even include, conducting links associated with the network connections served by the non-conducting links. Apportionment of the power to be delivered by each of the various first conducting links can be controlled to maintain the overall voltage level on each line within predetermined limits, dependant on the traffic carried on the respective connections.

The second intermediate point serves several connections, each having its own respective second conducting link, and the power to be delivered to the second intermediate connection point can be sourced from any or all of the customer premises locations served by that point. Again power can be apportioned according to the characteristics of each connection, which on the customer side may include significant differences in "final drop" line length or quality, and whether the customer premises equipment is able to deliver power, as well as the traffic volume considerations discussed above. In particular, each link need only draw power if the respective customer is using his communications line. When two or more customers are using their communication lines, the link is powered by the plurality of customers. This is achieved by sensing the usage of the communications line and distributing the amount of power drawn between the users. A more powerful (larger bandwidth capacity) link may be provided if the number of users increases above a threshold level.

The wireless link need not be permanently supported: more particularly it is only required when at least one data session is in progress between a customer premises and the network side of the connection.

The invention therefore powers both ends of the non-conducting link from the respective conducting links connected to the respective intermediate points.

It is desirable that the equipment powered at the second intermediate point (customer end) can be provided with at least a limited service even in the event of power failure at the customer end. In order to achieve this, a conventional twisted pair connection also connects the termination points of the non-conducting link, which can be used in certain circumstances to carry analogue telephony, or a limited digital capacity. A particular circumstance would be in the event of failure to the power supply to one or other end of the non-conducting link.

Limited control and management signals may be carried over this link to instruct the transceivers to switch on and start drawing power in order to initiate a high bandwidth data session. However, since most such sessions are initiated from the customer end, powering up of the second intermediate point can be initiated locally. For the first intermediate point, being connected to the exchange end, it is more convenient to maintain the power connection whether or not any communications sessions are currently in progress.

The invention therefore provides an arrangement in which the exchange and customer each power one end of a non-conducting bridge which is used to bypass the limited capacity available on a conducting connection.

BRIEF DESCRIPTION OF THE DRAWINGS

An embodiment of the invention will now be described with reference to the accompanying drawings, in which.

DETAILED DESCRIPTION OF PRESENT EXAMPLE EMBODIMENTS

Figure 1:
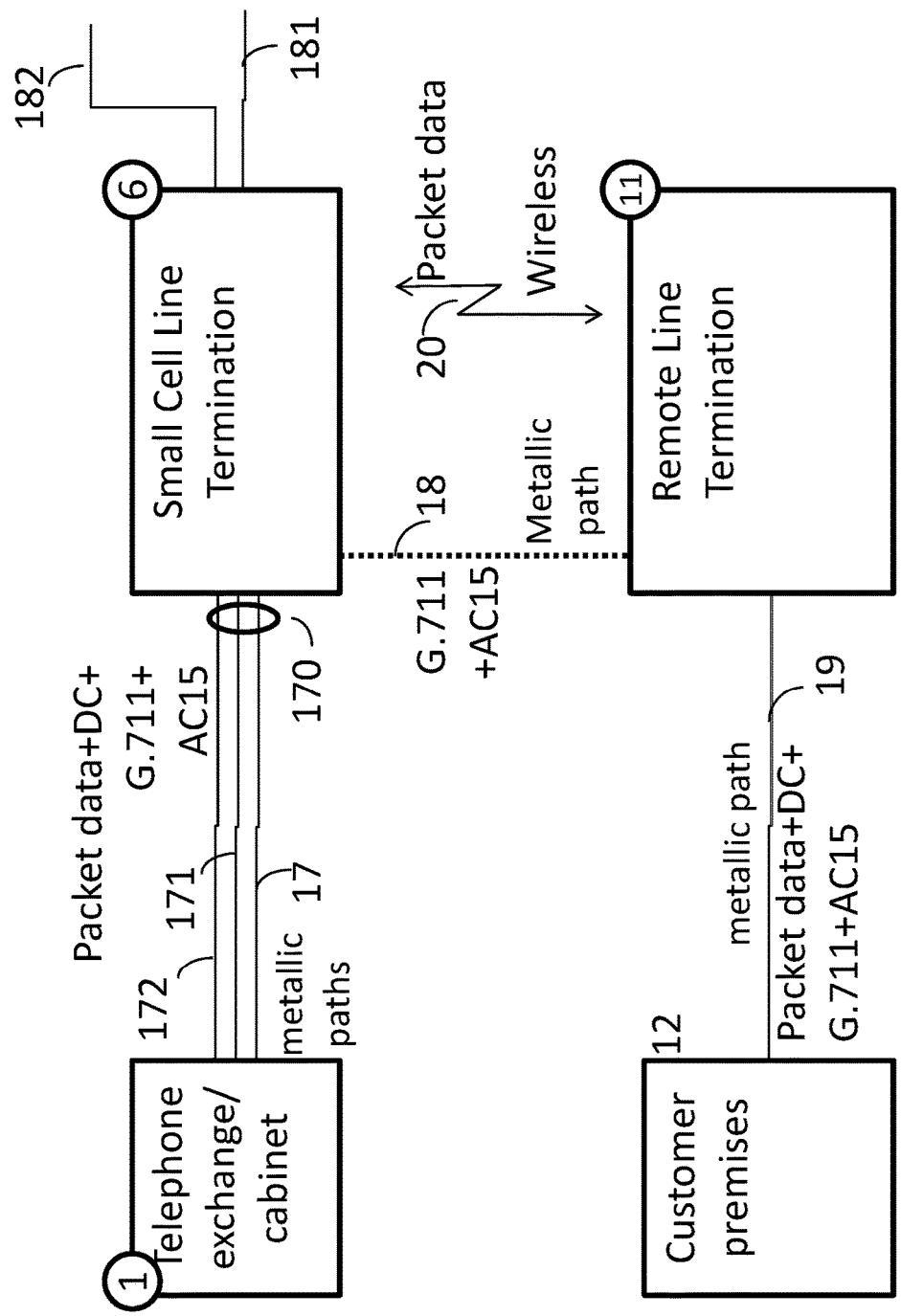
FIG. 1 is a schematic representation of a telecommunications connection between a telephone network connection point and a customer premises installation, which includes a wireless connection between a network side transceiver and a customer side transceiver.

FIG. 1 depicts a telecommunications connection 17, 18, 19 between a telephone network connection point 1 and a customer premises installation 12. The network connection point 1 may be an exchange, or some intermediate point between an exchange and a distribution point. The connection comprises a first metallic path electrical connection 17 between the exchange 1 and a distribution point 6, a second "final drop", metallic path electrical connection 18 between the distribution point 6 and a line termination 11, and a third, metallic path electrical connection 19 between the line termination 11 and the customer premises equipment 12. The first connection 17 typically forms part of a bundle 170 of parallel wired connections 171, 172 between the network connection point 1 and distribution point 6, from which separate connections 18, 181, 182 are provided to individual respective terminations.

In addition to the final drop connection 18, a wireless connection 20 is provided between respective transceivers 10,58 (see FIGS. 4 and 5) in the distribution point 6 and line termination 11. (The wireless connection may be substituted by a fibre optic link. The system is arranged such that traditional analogue telephony is normally carried over the "final drop" wire 18 and high bandwidth digital data traffic is carried over the wireless/fibre optic connection.

Figure 2:
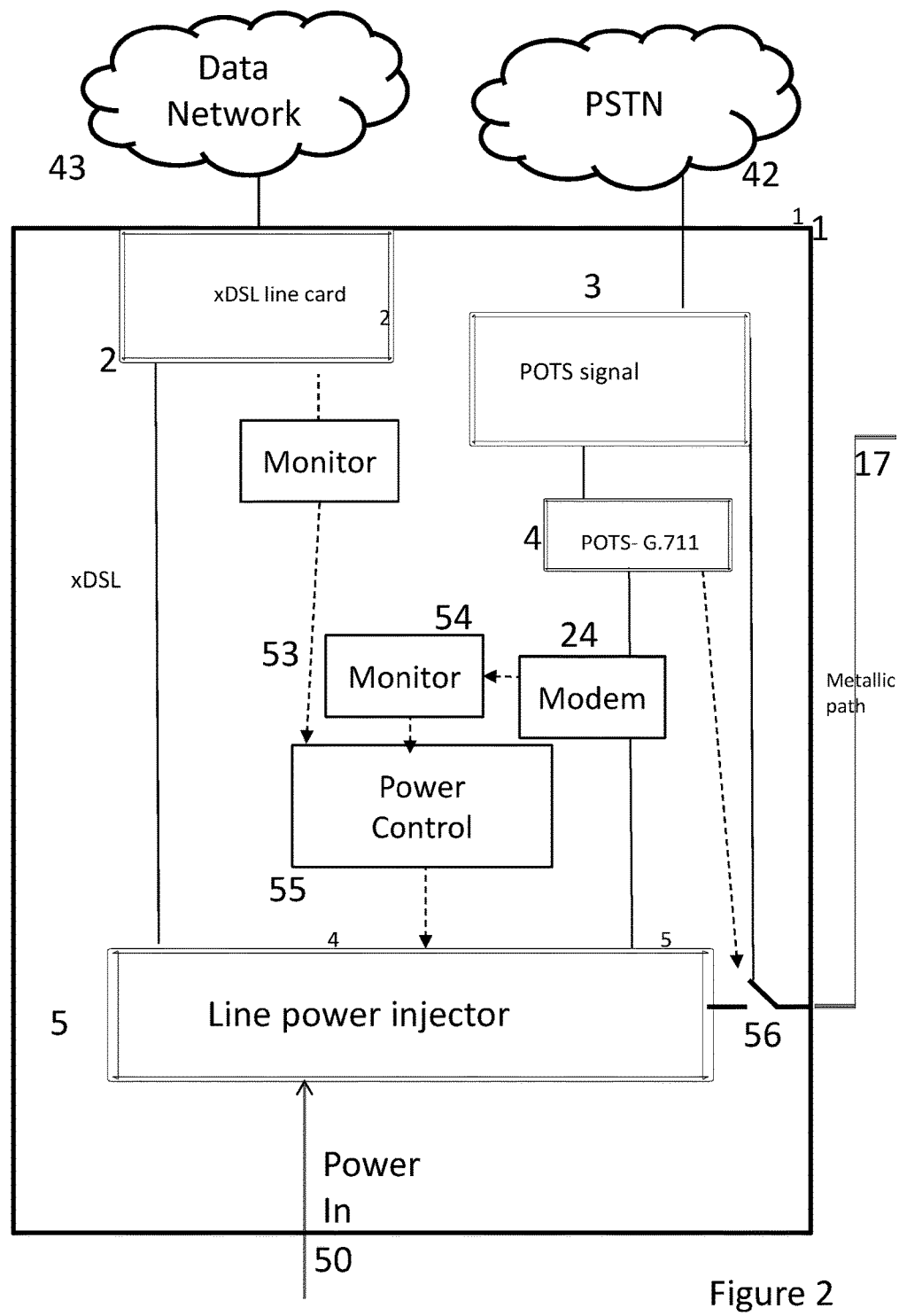
FIG. 2 is a schematic representation of the equipment installed at the telephone network connection point of FIG. 1.

FIG. 2 depicts part of the network connection point 1 in more detail, and specifically the elements associated with the first connection 17. The elements associated with an individual connection are often in the form of an exchangeable element or "line card" installed in the exchange for connection to the external line 17. In the present case, an analogue connection element 2 manages the "POTS" (plain old telephone service) connections to and from a circuit switched network 42 and a digital connection element 3 manages the "DSL" (digital subscriber loop) connections to and from a data network 43.

As is conventional, the wire pair 17 may carry both analogue (POTS) signalling and digital subscriber loop (xDSL) digital signalling, fed to the wire pair by respective line cards 2, 3 from respective circuit switched and packet switched networks 42, 43. The analogue "POTS" signal is digitised by a modulation element 4 which encapsulates the analogue POTS signal into a 64 kbps digital data stream using a pulse code modulation system with an 8 kHz sampling frequency, such as the G.711 standard, which can also incorporate signalling (ring current, dialling tones, etc) converted from a 16 kbps signalling stream (AC15 standard). This allows the channel control signalling to be carried on the same carrier as the digital G.711 signal. The G.711/signalling stream is modulated onto a band separate from the high frequency one used by the xDSL signal, for example using an SHDSL (symmetric HDSL) modem 24 running at 64 kbps, which is adequate for the G.711 coding.

The xDSL and SHDSL signals are then both modulated by a power injector 5 which is arranged to add a DC bias voltage from an external power source. The power injector is controlled to limit the voltage to a value acceptable to the wiring, well short of a level that would cause overheating or insulation breakdown. The level is controlled by a control function 55 responsive to monitors 53, 54 detecting peak voltages in the modulated G711 (SHDSL) and xDSL signals. This is used to power the electrical equipment at the distribution point 6. It will be noted that several metallic lines 17, 171, 172 connect the network connection point 1 to the distribution point 6, and the power control units 55 in each line card can therefore be co-ordinated to determine how much power is to be delivered by each connection.

Figure 3:
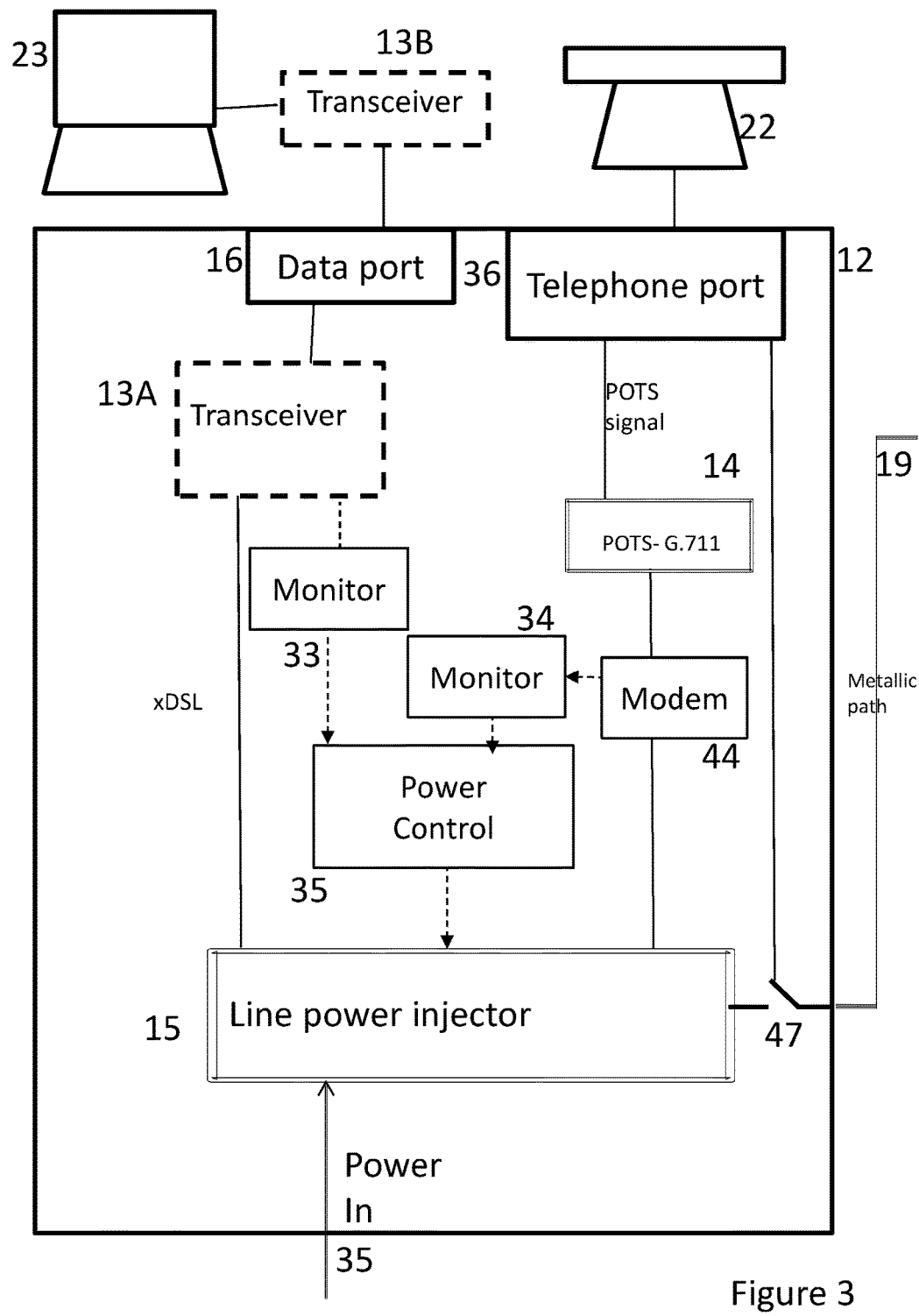
FIG. 3 is a schematic representation of the equipment installed at the customer premises depicted in FIG. 1

FIG. 3 depicts the Network Termination Equipment unit (NTE) 12 at the customer premises. In some respects it mirrors the functions of the network connection point 1. It provides a telephone port 36 for connection to a conventional analogue telephone 22, and a data port 16 for connection, e.g. by an Ethernet connection, to data equipment 23 installed at the customer premises. A transceiver 13A or 13B, injects high frequency (HF) data onto the metallic path 19 connecting the customer premises. For ADSL, the network termination (NTE) 16 occurs on the network side of the transceiver 13A (e.g. a user-provided router is plugged into the NTE). However, in VDSL, the transceiver 13B (e.g a VDSL modem) sits on the network side of the NTE 16, which exposes an Ethernet port to the user.

The analogue "POTS" signal received at the telephone port 36 is digitised by a modulation element 14 which encapsulates the analogue POTS signal into a 64 kbps digital data stream using a pulse code modulation system with an 8 kHz sampling frequency, such as the G.711 standard, which can also incorporate signalling (ring current, dialling tones, etc) converted from a 16 kbps signalling stream (AC15 standard). This allows the channel control signalling to be carried on the same carrier as the digital G.711 signal. The G.711/signalling stream is modulated onto a band separate from the one used by the xDSL signal, for example using an SHDSL (symmetric HDSL) modem 44 running at 84 kbps, which is adequate for the G.711 coding. As in the network connection point 1, the network termination equipment 12 also provides a line power converter 15 which injects electrical power, delivered from a source 35, onto the line 19. This is used to power the remote line termination 11. As with the network connection, monitoring functions 33, 34 provide inputs to a power control function 35 which controls the power to be delivered over the connection 19.

Figure 4:
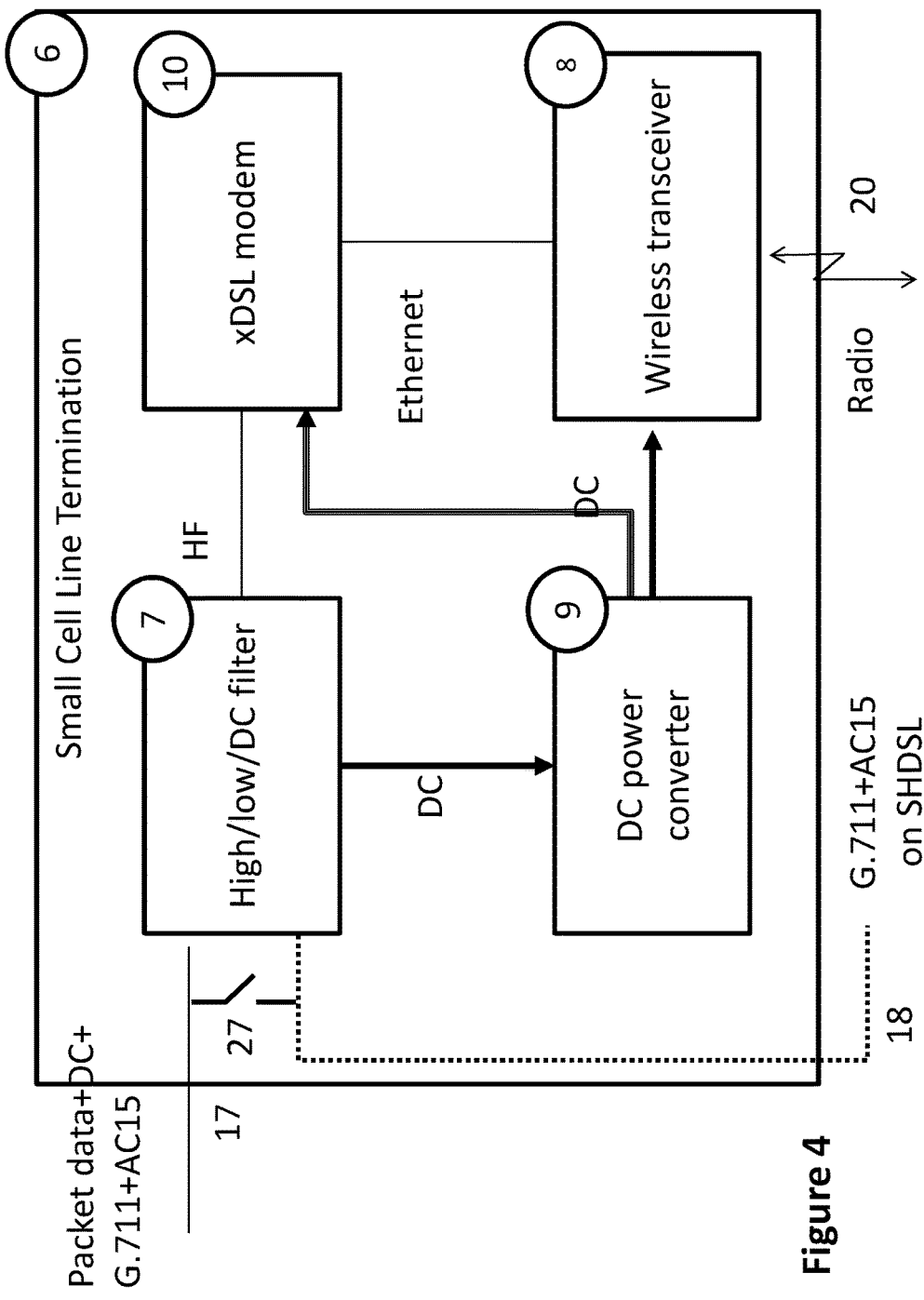
FIG. 4 is a schematic representation of the network side transceiver and associated equipment of FIG. 1, and associated equipment

FIG. 4 depicts the distribution point 6 of FIG. 1 in more detail. This is located at a convenient location such as on a roadside telephone pole, and contains a wireless transceiver 8, a line power converter 9, and an xDSL modem 10. The connection 17 from the exchange is connected to a high/low/DC filter 7 which separates the DC power component from the high frequency xDSL data signal and the tow frequency SHDSL signal on which POTS traffic is carried.

The POTS traffic is routed from the filter 7 to the metallic "final drop" wire 18. An xDSL modem 10 provides a signal for a wireless transceiver 8, which transmits and receives data over a wireless link 20. For example, it may be an 802.11 device. In the example shown here, Ethernet is used to connect the xDSL modem 10 and wireless transceiver 8.

A DC power converter 9 recovers the line power delivered from the connection 17 from the exchange 1 by way of the filter 7, and provides a stable voltage to power the xDSL modem 10 and wireless transceiver 8.

Figure 5:
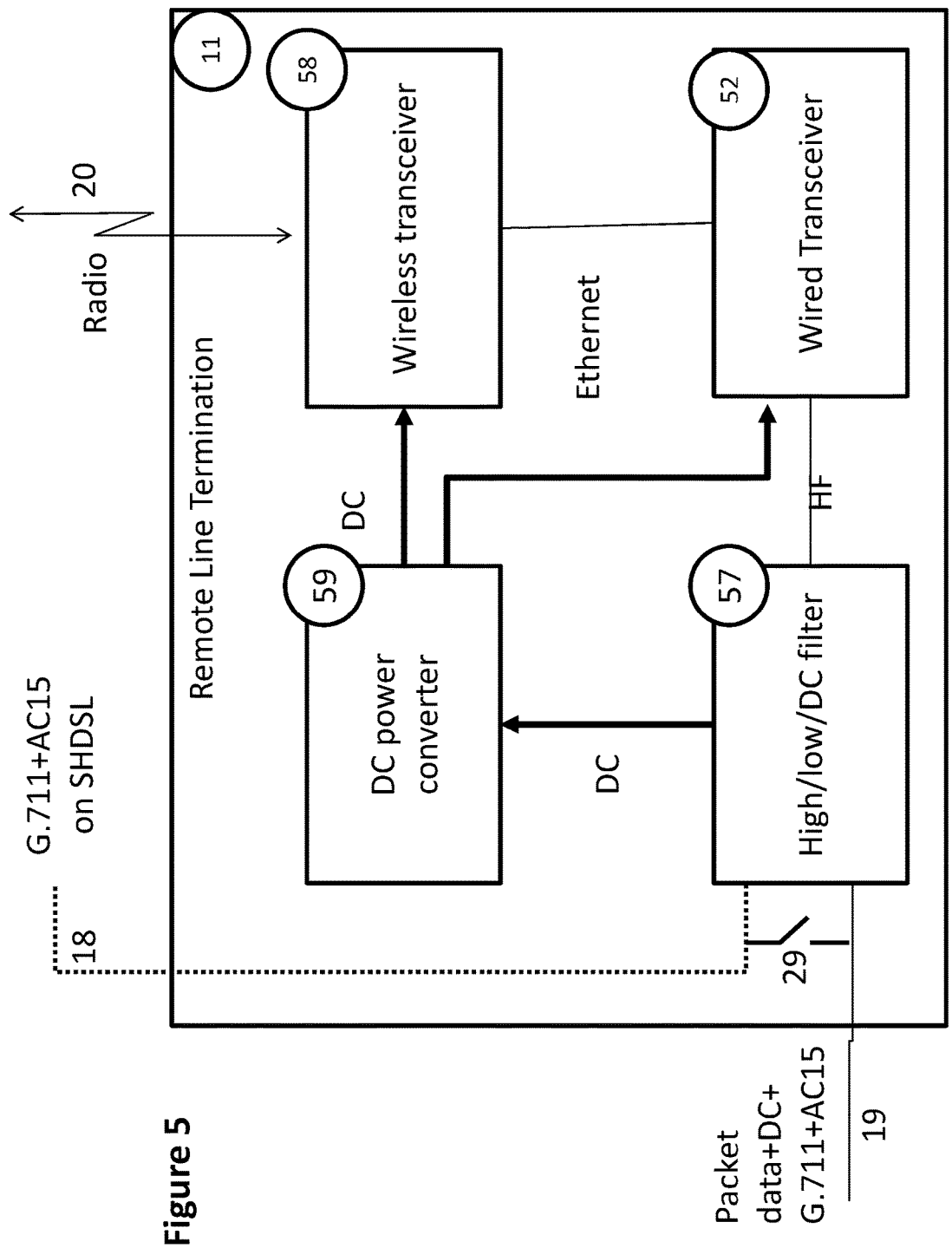
FIG. 5 is a schematic representation of the customer side transceiver and associated equipment of FIG. 1, and associated equipment

FIG. 5 depicts the line termination unit 11 located at the customer end of the wireless connection 20. This line termination unit 11 is physically similar to the distribution point 6 and operates in a similar manner. It thus has a high/low/DC filter 57 for separating the xDSL, SHDSL, and DC power delivered from the customer premises 12 over the connection 19, and a DC power converter 59 for recovering the line power delivered from the connection 19 and providing a stable voltage to power a wireless transceiver 58 and a wired transceiver 52. The wired transceiver 52 injects high frequency data onto the metallic path 19 connecting the customer premises.

This arrangement allows a high bandwidth connection 20 (depicted in the diagrams as wireless, but optical fibre or other systems may be used) to be provided over part of the connection between the exchange 1 and customer premises 12. This provision allows high bandwidth services to be provided without the need to replace the end-to-end wiring connection 17,18,19 with a connection having a higher bandwidth. Such replacement, requiring access to premises for the user connection 19 and "final drop" 18, can be relatively difficult to arrange.

A useful facility of this arrangement is that the wired connection 18 can remain in place and can be used to provide a limited service in the event that the high bandwidth service becomes unavailable. This may occur, for example, because of a power failure at the customer premises end, or simply because the customer does not wish to provide power from his own domestic supply 35 to keep the service on standby. Furthermore, the signalling channel carried at low bandwidth can also carry management and status information relating to the high bandwidth link.

If it is desired to maintain a POTS analogue service even when power is lost, a pair of relays 27, 29 may be provided. These relays respond to a reduction in power delivered over the connection 19 from the customer premises 12 by closing direct connections between the final drop line 18 and the respective metallic paths 17, 19 to the exchange 1 and to the customer premises 12, thus forming a direct electrical connection 17, 18, 19 enabling analogue POTS to be delivered direct from the exchange 1 to the customer equipment 12. The customer premises installation 12 includes a relay 47 responsive to the loss of power 35 to switch out the G711 POTS converter 14 and modem 44 and connect the telephone port 36 directly to the metallic path 19. At the network end 1, the G711 processor 4 and modem 24 are similarly switched out using a relay 56 if the G.711 processor detects that no G711 signalling is being received on the line, indicating that a direct end-to-end analogue connection exists to the customer premises 12.

In an alternative arrangement, voice traffic is carried on the xDSL carrier using the VoIP (Voice over Internet Protocol) system, in which case the G.711 signal is not required. Again, the system can be arranged to switch the voice signal to analogue, to be carried over the wireline link 18, in the event of a loss of power.

FIGS. 6 to 10 are schematic representations of a variant system in which the voice traffic is carried using the "Voice over Internet Protocol" system.

Figure 6:
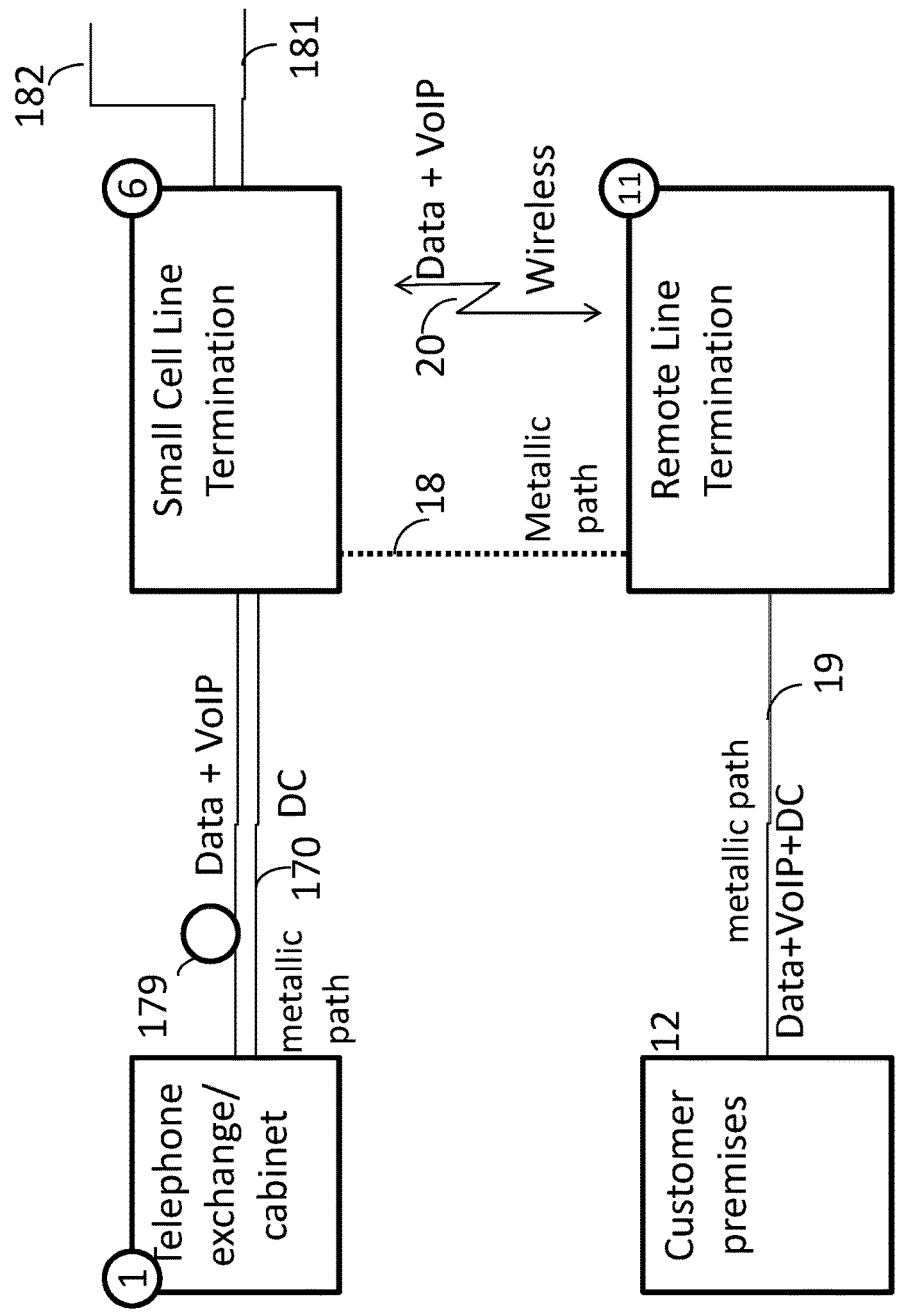
FIGS. 6 to 10 are schematic representations of a variant system.

FIG. 6 depicts the complete connection from the network connection point to the user premises, and FIGS. 7 to 10, equivalent to FIGS. 2 to 5 respectively, represent the equipment installed at the telephone network connection point, the customer premises, the network side transceiver and the customer side transceiver. Components which perform the same or equivalent functions as in the first embodiment have the same reference numerals as in that embodiment and will not be described again in detail.

In FIG. 6 the existing metallic path 170, made up of one or more wire pairs, remains in place, but in normal use carries no communications traffic, being used only for power delivery unless a power failure at the remote end is detected. Communications traffic between the network connection point 1 and the cell line termination 6 is carried over a fibre optic connection 179. This is a so-called "fibre to the pole (FTTP) system. The communications traffic includes voice traffic, carried in digital form using the Voice over Internet Protocol (VoIP). This can be carried as part of the xDSL traffic.

Figure 7:
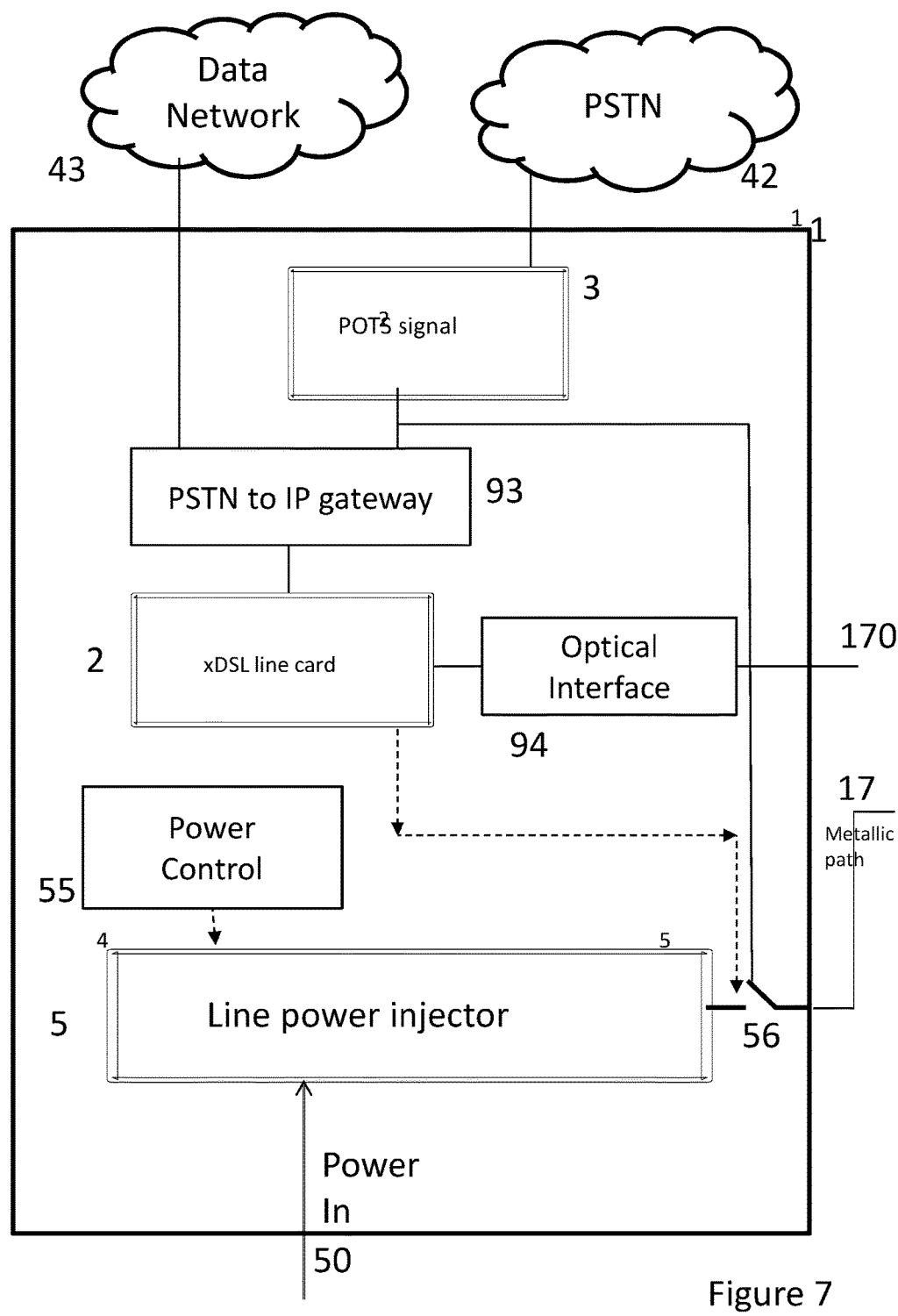

As shown in FIG. 7, by comparison with FIG. 2, at the network connection point (exchange) the incoming POTS signal 3 is converted to a VoIP form in a PSTN to IP gateway (93) which converts the POTS signal and the incoming data stream 43 data into data packets which are then injected into the packet network. The output of the line card 2 is fed to an optical interface 94 for delivery to the optical fibre link 179. The power control function 55 is much simplified as the data and voice traffic is not carried over the metallic link 17, so the power injector 5 can operate without regard to the communications traffic.

As with the FIG. 2 embodiment, if VoIP and/or data traffic is lost, a direct electrical connection 56 can be made to allow the POTS traffic 3 to be delivered by way of the metallic link 17.

Figure 8:
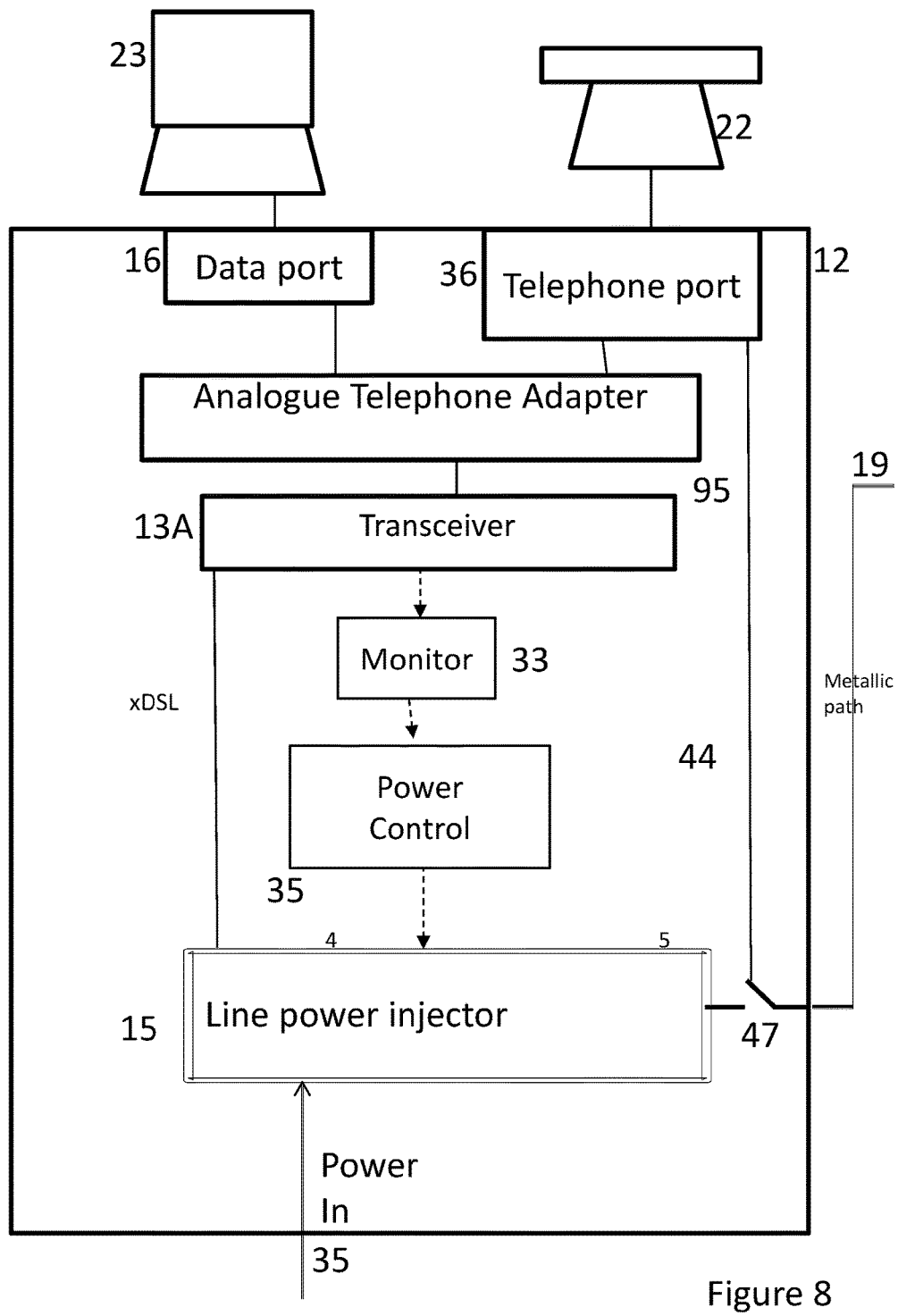

FIG. 8 is analogous to FIG. 3 and shows the arrangements at the customer premises. The telephone port 36 presents a standard analogue connection to the user equipment 22, and is connected to an Analogue Telephone Adapter 95 which converts the POTS signal and the data stream from the port 16 into data packets which are then injected into the packet network through the transceiver 13A which delivers them, as in the previous embodiment, to the "final drop" metallic path 19, with a dc bias added by a line power injector 15 as previously described. Note however that, as all voice and data traffic is handled by one transceiver the power control function is simplified, and there is no need for a separate frequency channel for a G.711 signal as the voice traffic is carried as VoIP.

As with the embodiment of FIG. 3, a loss of power at the injector 15 results in a direct metallic connection 47 being made between the telephone port 36 and metallic path 19.

Figure 9:
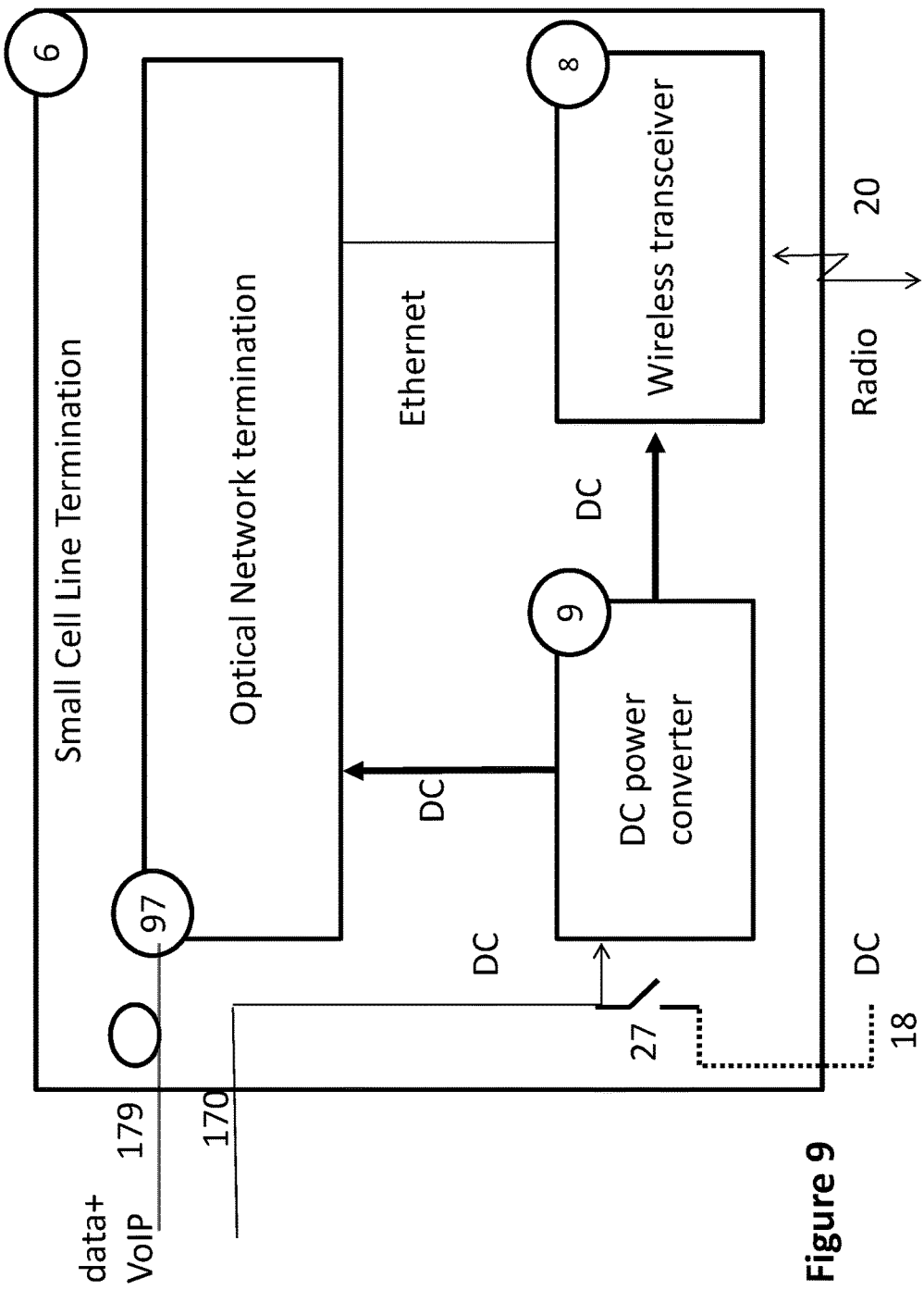

FIG. 9 depicts the line termination of FIG. 6 in more detail. It is similar to the arrangement shown in FIG. 4 in many respects, However, in addition to the metallic path 170 from the exchange, there is an optical fibre connection 179 which terminates in a conversion unit 97, and in normal circumstances carries all data and voice traffic. In this embodiment, the voice traffic using VoIP, but it may be carried in a separate optical channel and handled separately. Power is delivered from the exchange over the metallic connection 170 to a power converter 9, and is used to power the optical conversion unit 97, as well as the wireless transceiver 8 powered in the FIG. 4 embodiment.

A relay 27 provides a direct electrical connection between the metallic inks 17 and 18 in the event of loss of power being detected at the customer end, thus enabling the POTS connection to be maintained.

Figure 10:
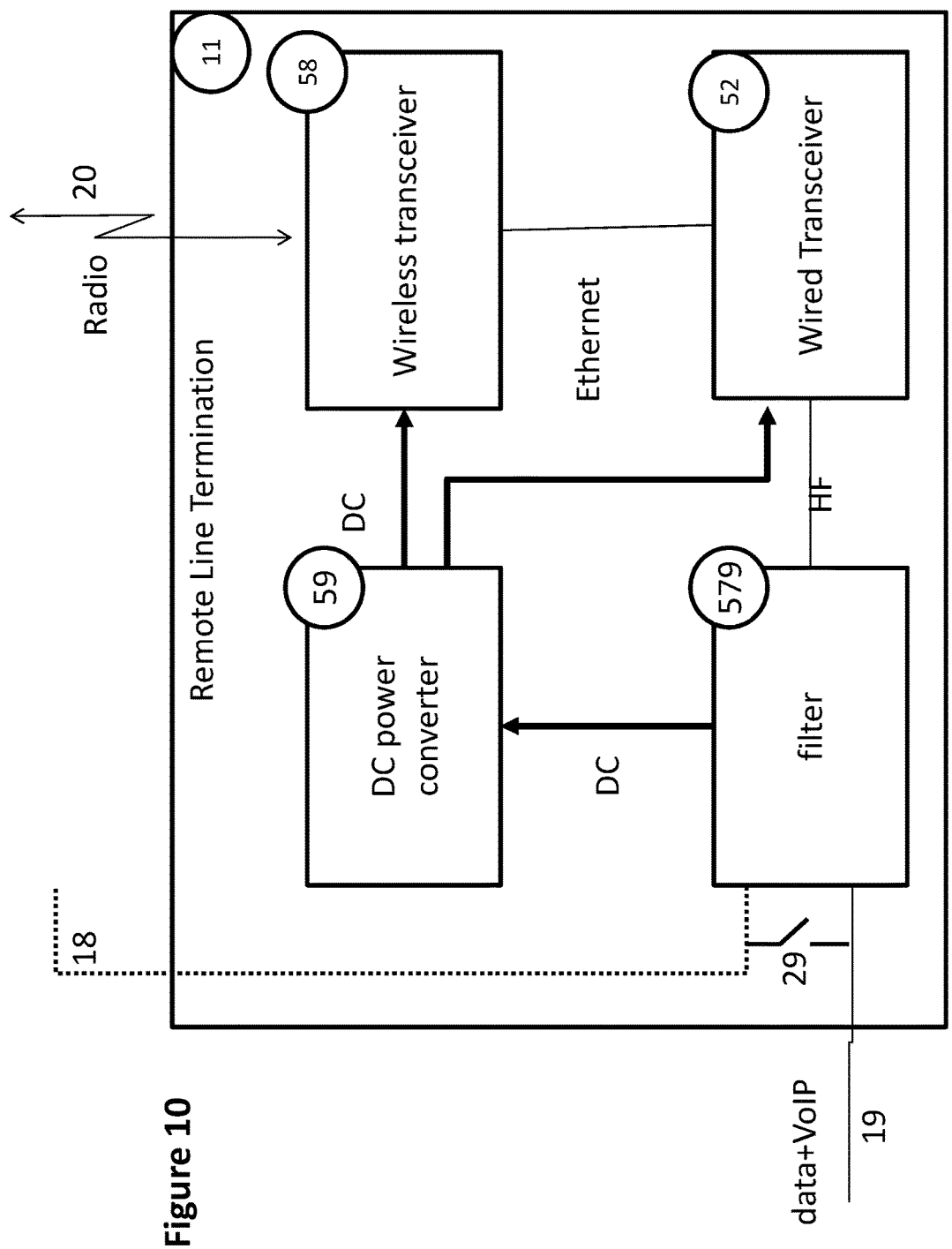

FIG. 10 depicts the customer side transceiver 58 and associated equipment. The arrangement is very similar to that of FIG. 5, but the traffic carried over the non-metallic link 20 has only one component (xDSL) and consequently the filter 579 is only required to separate the DC power component from the xDSL signal—there is no low frequency SHDSL component.

What is claimed is:

1. A communications connection within a telecommunications access network comprising:
    a first intermediate connection point,
    a second intermediate connection point remote from the first intermediate connection point, and
    a non-conducting communications link between the first intermediate point and the second intermediate point;
    the first intermediate connection point being connectable by way of a first conducting link to a telephone network connection point and the second intermediate connection point being connectable by a plurality of second conducting links to a plurality of remote customer premises installations, at least one of the first and second intermediate connection points having conversion equipment for converting transmissions between electrical signals carried over its respective conducting link, and a non-electrical signal carried over the non-conducting link; and
    the respective first and second conversion equipments being electrically powered, and having respective power conversion equipment for receiving electrical power delivered over the respective conducting links from the telephone network connection point and the customer premises installations.

2. The communications connection according to claim 1, wherein:
    the first intermediate connection point is connectable by way of a first conducting link to a telephone network connection point; and
    the second intermediate connection point being connectable by a plurality of second conducting links to a plurality of customer premises installations suitable to form communications connections between the telephone network connection point and the customer premises installations.

3. The communications connection according to claim 1, wherein the non-conducting communications link is a wireless communications link.

4. The communications connection according to claim 1, wherein the non-conducting communications link is an optical fibre link.

5. The communications connection according to claim 1, wherein:
    the first intermediate connection point serves several connections, each having its own respective first conducting link, and
    power can be delivered from the telephone network connection point to the first intermediate connection point over any one or more of the conducting links to operate the first conversion equipment.

6. The communications connection according to claim 1, wherein power is only drawn from customer premises links currently carrying communications traffic.

7. The communications connection according to claim 5, wherein the power conversion equipment can be controlled to maintain the overall voltage level on each line within predetermined limits, dependant on traffic carried on the respective connections.

8. The communications connection according to claim 1, wherein:
   there is provided an intermediate conducting connection between the first intermediate connection point and second intermediate connection point, and
   provision is made to carry communications services over the intermediate conducting connection.

9. The communications connection according to claim 8, having a detection system to detect failure to the power supply to the first or second intermediate connection points, and to divert communications over the intermediate conducting connection.

10. The communications connection according to claim 1, wherein:
   a wireless communication link is provided between the first intermediate point and the second intermediate point as the non-conducting communications link between the first intermediate point and the second intermediate point; and
   a wired connection link is also provided between the first intermediate connection point and the second intermediate connection point.

11. The communications connection according to claim 1, wherein:
   a fiber optic link is provided between the first intermediate point and the second intermediate as the non-conducting communications link between the first intermediate connection point and the second intermediate connection point; and
   a wired connection link is also provided between the first intermediate point and the second intermediate point.

12. The communications connection according to claim 1, wherein:
   a wired connection link is provided between the first intermediate connection point and the second intermediate connection point; and
   a relay provides an electrical connection between the first conducting link and the wired connection link in the event of loss of power being detected.

* * * * *